United States Patent
Kinose et al.

(10) Patent No.: US 11,120,922 B2
(45) Date of Patent: Sep. 14, 2021

(54) METHOD FOR PRODUCING SOLIDIFIED RADIOACTIVE WASTE

(71) Applicant: NIPPON CHEMICAL INDUSTRIAL CO., LTD., Tokyo (JP)

(72) Inventors: Yutaka Kinose, Tokyo (JP); Shinsuke Miyabe, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 425 days.

(21) Appl. No.: 16/308,619

(22) PCT Filed: Jun. 22, 2017

(86) PCT No.: PCT/JP2017/022939
§ 371 (c)(1),
(2) Date: Dec. 10, 2018

(87) PCT Pub. No.: WO2017/222000
PCT Pub. Date: Dec. 28, 2017

(65) Prior Publication Data
US 2019/0156964 A1    May 23, 2019

(30) Foreign Application Priority Data
Jun. 23, 2016   (JP) .............................. JP2016-124309

(51) Int. Cl.
*G21F 9/12*     (2006.01)
*G21F 9/30*     (2006.01)
*B01J 20/02*    (2006.01)
*B01J 20/04*    (2006.01)
*B01J 20/10*    (2006.01)

(52) U.S. Cl.
CPC ............. *G21F 9/12* (2013.01); *B01J 20/0211* (2013.01); *B01J 20/041* (2013.01); *B01J 20/10* (2013.01); *G21F 9/305* (2013.01); *G21F 9/308* (2013.01); *B01J 2220/42* (2013.01)

(58) Field of Classification Search
CPC ......... G21F 9/12; G21F 9/308; B01J 20/0211; B01J 20/041; B01J 20/10; B01J 2220/42
USPC ............................................. 588/18
See application file for complete search history.

(56) References Cited

U.S. PATENT DOCUMENTS

| | | |
|---|---|---|
| 5,340,372 A | 8/1994 | Macedo et al. |
| 5,662,579 A | 9/1997 | Bickford |
| 7,019,189 B1 | 3/2006 | Chekhmir et al. |
| 7,550,645 B2 | 6/2009 | Chekhmir et al. |

FOREIGN PATENT DOCUMENTS

| | | |
|---|---|---|
| JP | 56-94299 A | 7/1981 |
| JP | S57-117341 A | 7/1982 |
| JP | S58-24338 A | 2/1983 |
| JP | 58-184598 A | 10/1983 |
| JP | S60-56299 A | 4/1985 |
| JP | S60-100100 A | 6/1985 |
| JP | S60-137854 A | 7/1985 |
| JP | 2001-133594 A | 5/2001 |
| JP | 2002-087842 A | 3/2002 |
| JP | 2003-50297 A | 2/2003 |
| JP | 2005-207885 A | 8/2005 |
| JP | 2007-527005 A | 9/2007 |
| JP | 2009-526967 A | 7/2009 |
| JP | 2014-134463 A | 7/2014 |
| JP | 2014-142336 A | 8/2014 |
| JP | 2015-175726 A | 10/2015 |

OTHER PUBLICATIONS

International Search Report dated Sep. 19, 2017, issued in counterpart application No. PCT/JP2017/022939 (2 pages).

*Primary Examiner* — Edward M Johnson
(74) *Attorney, Agent, or Firm* — Westerman, Hattori, Daniels & Adrian, LLP (57) ABSTRACT

The present invention provides solidified radioactive waste into which a titanium-containing adsorbent having a radioactive element adsorbed thereto is vitrified, the solidified radioactive waste being capable of confining a large amount of the titanium-containing adsorbent having a radioactive element adsorbed thereto, and furthermore elution of the radioactive element from the vitrified waste being suppressed. The method of the present application includes a step of heat-melting a mixture that includes a titanium-containing adsorbent having a radioactive element adsorbed thereto, a $SiO_2$ source, and an $M_2O$ source (M represents an alkali metal element) to form vitrified waste. The titanium-containing adsorbent is preferably one or two or more kind such as silicotitanate, an alkali nonatitanate, and titanium hydroxide.

8 Claims, 3 Drawing Sheets

METHOD FOR PRODUCING SOLIDIFIED RADIOACTIVE WASTE

TECHNICAL FIELD

The present invention relates to a method for producing solidified radioactive waste, including vitrifying a titanium-containing adsorbent having a radioactive element adsorbed thereto.

BACKGROUND ART

Contaminated water containing radioactive elements that is released from the Fukushima Daiichi Nuclear Power Plant is treated using adsorbents in many cases. Treatment of such adsorbents used for the treatment is now causing a problem.

Methods for vitrifying radioactive waste have been contemplated, from the viewpoint of stably storing spent fuel from nuclear power plants and radioactive waste generated in reprocessing facilities over a long period.

With respect to vitrified radioactive waste, methods including use of borosilicate glass (see e.g., Patent Literatures 1 and 2), a method including use of $PbO$—$B_2O_3$—$ZnO$ or $PbO$—$B_2O_3$—$SiO_2$ glass (see e.g., Patent Literature 3), a method including use of magnesium phosphate glass (see e.g., Patent Literature 4), and a method including use of $Fe_2O_3$—$P_2O_3$ glass (see e.g., Patent Literature 5) have been suggested, for example.

CITATION LIST

Patent Literature

Patent Literature 1: National Publication of International Patent Application No. 2009-526967
Patent Literature 2: National Publication of International Patent Application No. 2007-527005
Patent Literature 3: Japanese Patent Laid-Open No. 2003-50297
Patent Literature 4: Japanese Patent Laid-Open No. 2005-207885
Patent Literature 5: Japanese Patent Laid-Open No. 2014-142336

SUMMARY OF INVENTION

Technical Problem

High-level radioactive waste is now vitrified with borosilicate glass.

Crystalline silicotitanates, which have excellent adsorptivity for cesium, further for strontium, have been used as adsorbents for waste water in nuclear power plants. In the case of vitrifying a titanium-containing adsorbent having a radioactive element adsorbed thereto with borosilicate glass, however, a temperature as high as 1500° C. or higher is required. Furthermore, the amount of the adsorbent, containing a radioactive element, to be confined in glass has to be at most of the order of 25% by mass, in respect of a glass composition. It is thus necessary to provide a space wider than ever before for storing such radioactive waste.

It is thus an object of the present invention to provide solidified radioactive waste into which a titanium-containing adsorbent having a radioactive element adsorbed thereto is vitrified, the solidified radioactive waste being capable of confining a large amount of the titanium-containing adsorbent having a radioactive element adsorbed thereto, and furthermore elution of the radioactive element from the vitrified waste being suppressed.

Solution to Problem

The present inventors have intensively studied to solve the above problem, and, as a result, have found that a mixture obtained by adding, to a titanium-containing adsorbent having a radioactive element adsorbed thereto as a main $TiO_2$ source, further a $SiO_2$ source and an $M_2O$ source (M represents an alkali metal element.) is heat-melted to obtain $M_2O$—$SiO_2$—$TiO_2$-based vitrified waste, that the vitrified waste can confine a larger amount of the spent titanium-containing adsorbent at a lower temperature in the glass, compared with the case where borosilicate glass is used, and that the vitrified waste will be a solidified radioactive waste from which elution of the radioactive element is suppressed, having completed the present invention.

That is, an invention to be provided by the present invention is a method for producing solidified radioactive waste, including heat-melting a mixture that includes a titanium-containing adsorbent having a radioactive element adsorbed thereto, a $SiO_2$ source, and an $M_2O$ source (M represents an alkali metal element) to form vitrified waste.

Advantageous Effects of Invention

According to the method for producing solidified radioactive waste according to the present invention, it is possible to provide solidified radioactive waste into which a titanium-containing adsorbent having a radioactive element adsorbed thereto is vitrified, the solidified radioactive waste being capable of confining a large amount of the titanium-containing adsorbent having a radioactive element adsorbed thereto, and additionally, elution of the radioactive element from the vitrified waste being suppressed.

DESCRIPTION OF EMBODIMENT

Hereinafter, the present invention will be described based on a preferred embodiment.

A method for producing solidified radioactive waste of the present invention is characterized by heat-melting a mixture that includes a titanium-containing adsorbent having a radioactive element adsorbed thereto, a $SiO_2$ source, and an $M_2O$ source (M represents an alkali metal element) to form vitrified waste.

That is, the present invention basically includes the following steps of (a) to (c):
(a) raw material mixing step;
(b) melting step; and
(c) cooling step.
(a) Raw Material Mixing Step The raw material mixing step is a step of mixing each of raw materials to prepare a homogeneous raw material mixture.

A titanium-containing adsorbent having a radioactive element adsorbed thereto according to the raw material mixing step is a titanium-containing adsorbent to which a radioactive element has been allowed to be adsorbed.

Example of a radioactive element to be adsorbed by the titanium-containing adsorbent include metal ion elements such as Cs, Sr, Ru, and Sb. These elements may include one or two or more metal ions adsorbed thereto. Of these, Cs and Sr are particularly preferred.

Examples of the titanium-containing adsorbent include silicotitanates, alkali nonatitanates, and titanium hydroxide. One of these may be used or two or more of these may be used. The titanium-containing adsorbent may be crystalline or may be amorphous.

Examples of the silicotitanate include a silicotitanate represented by the general formula: $A_4Ti_4Si_3O_{16} \cdot nH_2O$ (wherein A represents one or two alkali metals selected from Na and K, and n represents a number of 0 to 8.) and having a Ti/Si molar ratio of 4/3 (hereinafter, may be referred to as "GTS") and a silicotitanate represented by $A'_2Ti_2O_3(SiO_4) \cdot nH_2O$ (wherein A represents one or two alkali metal elements selected from Na and K, and n represents 0 to 2.) and having a Ti/Si molar ratio of 2/1 (hereinafter, may be referred to as "CST").

Such silicotitanates may contain Nb, Al, Zr, and the like in an amount of 0.1 to 20% by mass.

Examples of the alkali nonatitanate include alkali nonatitanates represented by the general formula: $A''_4Ti_9O_{20} \cdot mH_2O$ (wherein A" represents one or two alkali metal elements selected from Na and K, and m represents a number of 0 to 10.) (hereinafter, may be referred to as "SNT").

Examples of the titanium hydroxide include the titanium hydroxides described in, for example, Japanese Patent Laid-Open No. 2014-142336 and Japanese Patent Laid-Open No. 2013-78725.

In the present invention, it is possible to allow the raw material mixture to contain one or two or more titanium-containing adsorbents having a radioactive element adsorbed thereto.

The titanium-containing adsorbent having a radioactive element adsorbed thereto also may contain an organic and/or inorganic binder.

The titanium-containing adsorbent having a radioactive element adsorbed thereto may be used as large granular granulated particle having a particle diameter of 300 to 2000 μm in many cases. These granulated particles may be subjected to pulverization or disintegration in advance as desired, before mixing of each raw material, in the present invention, in order to improve the dispersibility of the particles into the raw material mixture.

As the $SiO_2$ source according to the raw material mixing step, chemically synthesized silica such as white carbon, silica sol, fumed silica, silica gel, and molten silica or natural silica such as silica sand, diatom, and silica stone may be used.

As the $M_2O$ source (M represents an alkali metal element.) according to the raw material mixing step, an oxide, hydroxide, carbonate, nitrate or the like containing an M element may be used. In the present invention, as the alkali metal element (M) to be contained in the raw material mixture, Na is preferred from the viewpoint that Na, particularly when vitrified, has a stronger bonding force of $M_2O$—$SiO_2$ than that of other alkali metal elements.

In the present invention, the $SiO_2$ source and the $M_2O$ source may each be a compound that contains a $SiO_2$ source and an $M_2O$ source. Examples of the compound that contains a $SiO_2$ source and an $M_2O$ source include alkali silicates.

Examples of the alkali silicates include alkali metasilicates, alkali orthosilicates, alkali disilicates, alkali tetrasilicates, and water glass.

In the present invention, the $SiO_2$ source and the $M_2O$ source are each preferably an alkali silicate, which is a compound containing $SiO_2$ and $M_2O$, particularly sodium metasilicate, from the viewpoint that sodium metasilicate has a $Na_2O:SiO_2$ molar ratio of 1:1 and thus facilitates the composition adjustment.

In the present invention, the $SiO_2$ source and the $M_2O$ source may each be a hydrate or anhydride. From the viewpoint of a smaller weight loss and better melting efficiency in melting and vitrifying, an anhydride is particularly preferred.

The amount of each raw material to be blended is preferably adjusted such that the composition of the raw material mixture achieves at least the following composition, from the viewpoint of obtaining a solidified radioactive waste which confines a large amount of a titanium-containing adsorbent having a radioactive element adsorbed thereto in vitrified waste as well as from which elution of the radioactive element is suppressed:

$M_2O$: 15 to 35% by mass, preferably 15 to 30% by mass,
$TiO_2$: 25 to 50% by mass, preferably 28 to 45% by mass, and
$SiO_2$: 15 to 35% by mass, preferably 15 to 30% by mass.

The molar ratio of $M_2O/SiO_2$ in the raw material mixture is 0.80 to 1.20, preferably 0.85 to 1.15, from the viewpoint that vitrification is enabled at a temperature of 1200° C. or less.

The molar ratio of $TiO_2/SiO_2$ in the raw material mixture is 0.80 to 1.30, preferably 0.85 to 1.25, from the viewpoint that vitrification is enabled at a temperature of 1200° C. or less.

Preparing the composition of the raw material mixture within the range by setting the amount of the titanium-containing adsorbent having a radioactive element adsorbed thereto to be blended in the raw material mixture at 50 to 75% by mass, preferably at 65 to 72% by mass is preferred, from the viewpoint of obtaining a solidified radioactive waste which is capable of confining a large amount of the titanium-containing adsorbent having a radioactive element adsorbed thereto and additionally, from which elution of the radioactive element is suppressed.

In the present invention, further addition of a metal oxide source containing one or two or more metal elements (A) selected from Zr, Al, Nb, Zn, Ca, and Mg to the raw material mixture can afford solidified radioactive waste from which elution of the radioactive element is further suppressed.

As the metal oxide source that can be used, an oxide, hydroxide, carbonate, nitrate or the like containing the metal element(s) (A) can be used.

In the present invention, as the metal oxide source, (1) a compound containing a metal oxide source and a $SiO_2$ source, (2) a compound containing a metal oxide source and an $M_2O$ source, or (3) a compound containing a metal oxide source, a $SiO_2$ source, and an $M_2O$ source may be used.

It is preferred that the raw material mixture contain an amount of the metal oxide source to be added of 1 to 10% by mass, preferably 3 to 10% by mass, in terms of the metal oxide, from the viewpoint of obtaining a solidified radioactive waste from which elution of the radioactive element is further suppressed. When any of the compounds (1) to (3) described above is used as the metal oxide source, it is only required to add the metal oxide source such that the amount of each of $M_2O$, $SiO_2$, $TiO_2$, and the metal oxide derived from the metal oxide source in the raw material mixture is within the range described above.

The means of mixing each of the raw materials according to the raw material mixing step is not particularly limited, and a dry method is preferably performed so as to provide a mixture in which the raw materials described above are homogeneously dispersed.

As an apparatus to be used in the homogeneous mixing operation, apparatuses such as a high-speed mixer, super mixer, turbo-sphere mixer, Henschel mixer, Nauta mixer, ribbon blender, and V-type mixer can be used, for example. These homogeneous mixing operations are not limited to mechanical means exemplified. Alternatively, the particle size may be adjusted by pulverization using a jet mill. At a laboratory level, a mixer for domestic use or manual mixing may be sufficient.

The raw material mixture thus obtained, in which the raw materials are homogeneously mixed, is subjected to the next melting step (b).

(b) Melting Step

The melting step is a step of heat-melting the raw material mixture, obtained above, in which the raw materials are homogeneously mixed.

The temperature for heat-melting is 1000° C. or more. The reason is that, with a temperature for heat-melting of less than 1000° C., it is difficult to melt the mixture and homogeneous glass melt is unlikely to be obtained. In the present invention, vitrification at a lower temperature is enabled in comparison with the temperature in a method including use of borosilicate glass, and thus, the temperature for heat-melting is preferably 1100 to 1300° C., particularly 1100 to 1250° C., from the viewpoint of utilizing this advantage.

The time for heat-melting is not critical in the present invention, and thus, it is only required to perform heat-melting so as to obtain homogeneous glass melt. Heating generally for one hour or more, preferably for 2 to 5 hours can provide homogeneous glass melt.

The homogeneous glass melt thus obtained is subject the next cooling step (c).

(c) Cooling Step

The cooling step is a step of cooling the homogeneous glass melt obtained above to thereby obtain solidified radioactive waste as vitrified waste.

Whether rapid cooling or slow cooling conditions are used, vitrified waste can be easily obtained. However, from the viewpoint of obtaining solidified radioactive waste from which elution of a radioactive element is suppressed, rapid cooling is preferably used.

A method for rapidly cooling glass melt is not particularly limited as long as the method enables rapid cooling. A publicly-known water cooling or air cooling may be applicable.

The solidified radioactive waste of the present invention is thus obtained as vitrified waste. Furthermore, the particle size may be adjusted by performing pulverization, classification, or the like, as required.

EXAMPLES

Hereinafter, the present invention will be described with reference to examples, but the present invention is not intended to be limited thereto.

<Preparation of Adsorbent Having Cs Adsorbed Thereto>
1. Sample having Cs Adsorbed Thereto (GTS+SNT):
<Preparation of Adsorbent (GTS+SNT)>
(1) First Step Mixed and stirred were 90 g of sodium silicate No. 3, 667.49 g of a sodium hydroxide aqueous solution, and 84.38 g of pure water to obtain a mixed aqueous solution. To this mixed aqueous solution, 443.90 g of a titanium tetrachloride aqueous solution was continuously added by means of a Perista pump over an hour and 20 minutes to produce a mixed gel. The mixed gel, after addition of the titanium tetrachloride aqueous solution thereto, was left to stand for aging at room temperature for an hour.

(2) Second Step

The mixed gel obtained in the first step was placed in an autoclave, and the temperature was raised to 170° C. over an hour. Then, while this temperature was maintained, a reaction was conducted under stirring for 24 hours. The slurry after the reaction was filtered, washed, and dried to obtain a mixture of bulk crystalline silicotitanate and sodium nonatitanate. The bulk adsorbent obtained was pulverized in a mortar and classified with a 100-μm sieve. The powder under the sieve was used as an adsorbent (GTS+SNT) sample.

Figure 1:
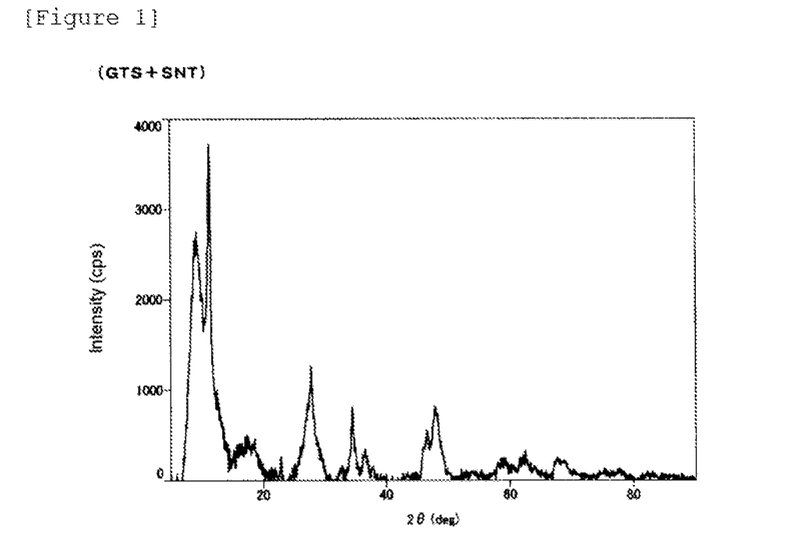
FIG. 1 is an X-ray diffraction diagram of an adsorbent used in Examples (GTS+SNT).

The particulates obtained were subjected to X-ray diffraction structure. The results are shown in FIG. 1. As shown in FIG. 1, the particulates obtained, which had the main phase of $Na_4Ti_4Si_3O_{16}.nH_2O$ and in which $Na_4Ti_9O_{20}.mH_2O$ was detected, were identified as a mixture of the crystalline silicotitanate and the sodium nonatitanate. Additionally, the particulates had a ratio of the height of the main peak (M.P.) originating from $Na_4Ti_9O_{20}.5$ to $7H_2O$ observed in the range of 2θ=8 to 10° to the height of the M.P. originating from $Na_4Ti_4Si_3O_{16}. 6H_2O$ observed in the range of 2θ=8 to 13°, of 38.5%.

<Preparation of Sample Having Cs Adsorbed Thereto (GTS+SNT)>

In 1000 ml of ion exchange water, 3.77 g of $CsNO_3$ was dissolved, and 50 g of the adsorbent (GTS+SNT) prepared above was added thereto. The solution was stirred at room temperature (25° C.) for 24 hours to allow Cs to be adsorbed until saturation was reached. After the completion of the stirring, the solution was subjected to filtration and repulp washing by a routine method. Then, the residue was dried and disintegrated using a desktop mill to obtain a sample having Cs adsorbed thereto (GTS+SNT).

As a result of fluorescence X-ray analysis of the sample having Cs adsorbed thereto (GTS+SNT), the sample having Cs adsorbed thereto (GTS+SNT) had the following composition:
$Na_2O$: 10.4 wt %
$SiO_2$: 13.8 wt %
$TiO_2$: 50.8 wt %, and
$Cs_2O$: 7.0 wt %.

2. Nb-CST Sample Having Cs Adsorbed Thereto:
<Preparation of Adsorbent (Nb-CST)>
(1) First Step Mixed and stirred were 115 g of sodium silicate No. 3,670.9 g of a sodium hydroxide aqueous solution, and 359.1 g of ion exchange water to obtain a mixed aqueous solution. To this mixed aqueous solution, 25.5 g of niobium hydroxide ($Nb_2O_5$: 76.5% by mass) was added, and the mixed solution was stirred and mixed. Then, 412.3 g of a titanium tetrachloride aqueous solution was continuously added by means of a Perista pump over 0.5 hours to produce a mixed gel. The gel, after addition of the titanium tetrachloride aqueous solution thereto, was left to stand for aging at room temperature (25° C.) for an hour.

(2) Second Step

The mixed gel obtained in the first step was placed in an autoclave, and the temperature was raised to 160° C. over an hour. Then, while this temperature was maintained, a reaction was conducted under stirring for 18 hours.

The slurry after the reaction was filtered, washed, and dried to obtain bulk crystalline silicotitanate. The bulk adsorbent obtained was pulverized in a mortar and classified with a 100-μm sieve. The powder under the sieve was used as a Nb-CST sample having Cs adsorbed thereto.

Figure 2:
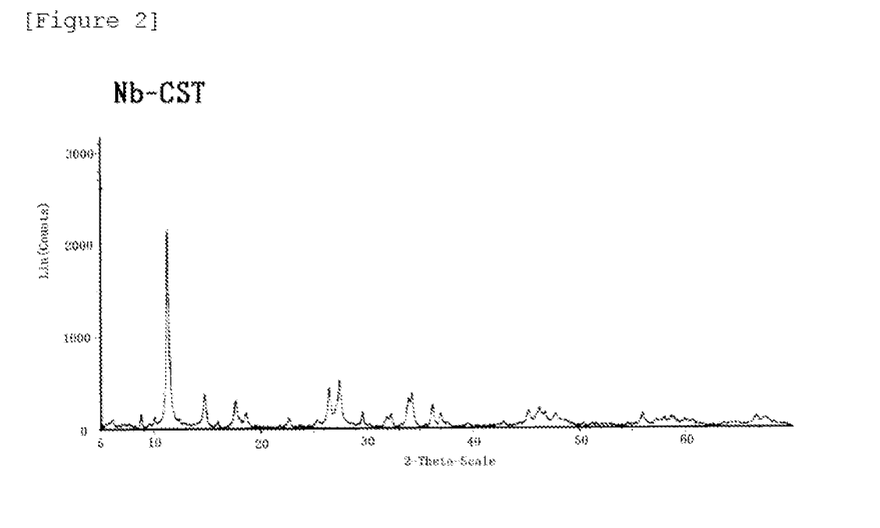
FIG. 2 is an X-ray diffraction diagram of an adsorbent used in Examples (Nb-CST).

The particulates obtained were subjected to X-ray diffraction measurement. The results are shown in FIG. 2. As a result of composition analysis by means of ICP-AES, the particulates were identified as crystalline silicotitanate which is represented by $Na_2Ti_2O_3(SiO_4).2H_2O$, contains Nb of 12.2% by mass, and has a Ti/Si molar ratio of 2/1.

<Preparation of Nb-CST Having Cs Adsorbed Thereto>

In 1000 ml of ion exchange water, 3.77 g of $CsNO_3$ was dissolved, and 50 g of the adsorptive (Nb-CST) prepared above was added thereto. The solution was stirred at room temperature (25° C.) for 24 hours to allow Cs to be adsorbed until saturation was reached. After the completion of the stirring, the solution was subjected to filtration and repulp washing by a routine method. Then, the residue was dried and disintegrated using a desktop mill to obtain a Nb-CST sample having Cs adsorbed thereto.

As a result of fluorescence X-ray analysis of the Nb-CST sample having Cs adsorbed thereto, the Nb-CST sample having Cs adsorbed thereto had the following composition:

$Na_2O$: 11.3 wt %
$SiO_2$: 16.4 wt %
$TiO_2$: 34.9 wt %
$Nb_2O_5$: 9.2 wt %, and
$Cs_2O$: 5.7 wt %.

Example 1

<Preparation of $Na_2O.SiO_2$ Component>

To 160 g of 25% sodium hydroxide, 31.5 g of amorphous silica (white carbon) was added, and the mixture was subjected to heating reaction at 90° C. for two hours. Additionally, the mixture was concentrated with a drier, and then evaporated to dryness by heating in an electric furnace to 300° C. After cooling, the dried mixture was pulverized in a mortar to obtain $Na_2O.SiO_2$ ($Na_2O$: 50.8% by mass, $SiO_2$: 49.2% by mass, $Na_2O/SiO_2$ molar ratio=1.0).

<Preparation of Vitrified Waste>

Mixed were 10 g of sample having Cs adsorbed thereto (GTS+SNT) prepared above and 3.84 g of $Na_2O.SiO_2$ prepared above to obtain a raw material mixture having at least the following composition:

$Na_2O$: 23.5 wt %
$SiO_2$: 27.2 wt %
$TiO_2$: 42.2 wt %
$Cs_2O$: 5.8 wt %, and
$Na_2O/SiO_2$ molar ratio: 0.88.

Subsequently, the mixture was placed in a platinum crucible and heat-melted at 1100° C. for 2 hours.

Then, the crucible was tilted over on a SUS tank to pour the heated melt thereto for water granulation (quenching).

Figure 3:
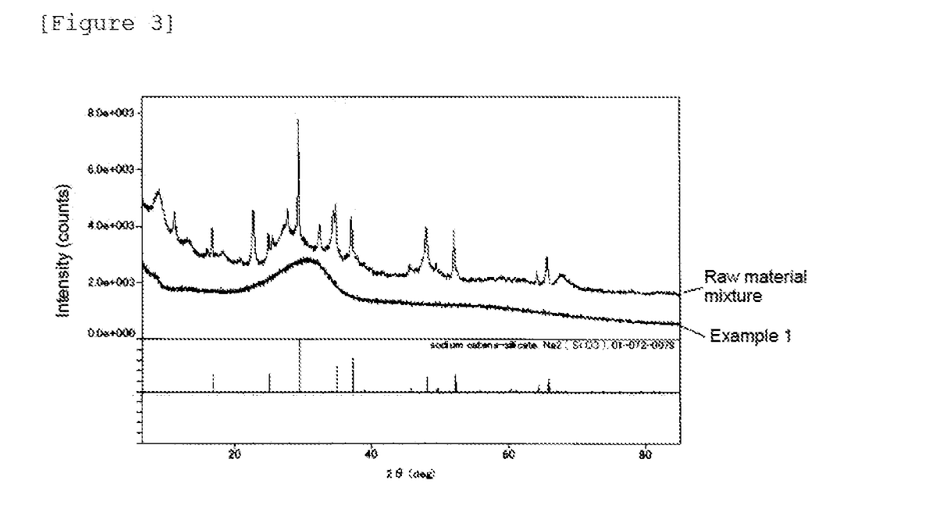
FIG. 3 is an X-ray diffraction diagram of a water-granulated sample obtained in Example 1.

The water granulates were pulverized after drying, and the particle size of the granulates was adjusted to 0.5 to 1 mm. Then, the pulverized granulates were subjected to XRD analysis. The X-ray diffraction diagram of the water-granulated sample obtained is shown in FIG. 3. The X-ray diffraction diagram of the raw material mixture is also shown in FIG. 3.

From the results of FIG. 3, it was not possible to identify obvious diffraction peaks, and thus, it was possible to identify complete vitrification.

Comparative Example 1

To 60 parts of ZnO and 20 parts of $B_2O_3$, 20 parts of the sample having Cs adsorbed thereto (GTS+SNT) was mixed. The raw material mixture was placed in a platinum crucible and heat-melted at 1100° C. for 2 hours.

Then, the crucible was tilted over on a SUS tank to pour the heated melt thereto for water granulation (quenching).

Figure 4:
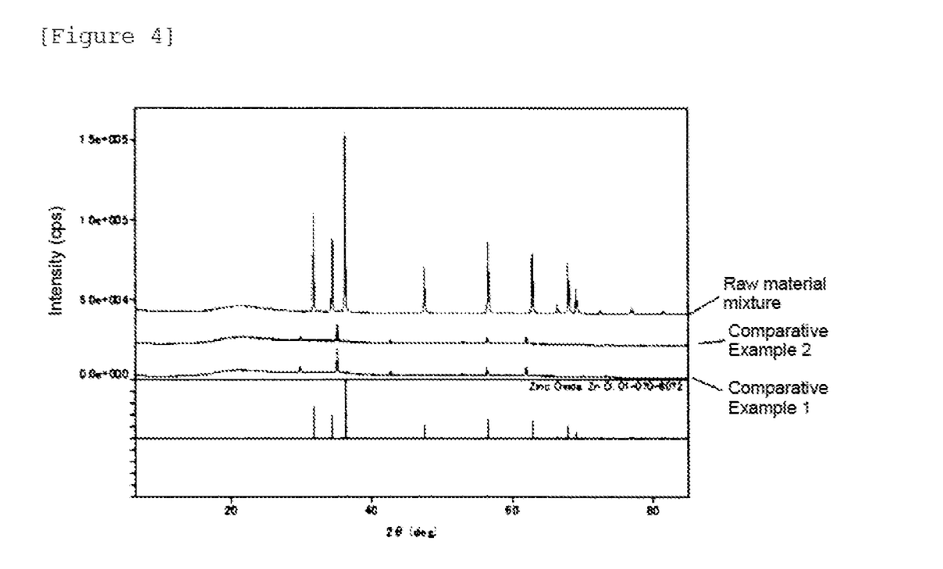
FIG. 4 is an X-ray diffraction diagram of water-granulated samples obtained in Comparative Example 1 and Comparative Example 2.

The water granulates were pulverized after drying, and the particle size of the granulates was adjusted to 0.5 to 1 mm. Then, the pulverized granulates were subjected to XRD analysis. The X-ray diffraction diagram of the water-granulated sample obtained is shown in FIG. 4. The X-ray diffraction diagram of the raw material mixture is also shown in FIG. 4.

As the results from FIG. 4, it was possible to identify obvious diffraction peaks, and thus, it was not possible to achieve complete vitrification.

Comparative Example 2

Water granulates were obtained under the same conditions as in Comparative Example 1 except that the amount of the sample having Cs adsorbed thereto (GTS+SNT) added was 26.7 parts. The water granulates were pulverized after drying, and the particle size of the granulates was adjusted to 0.5 to 1 mm. Then, the pulverized granulates were subjected to XRD analysis.

The X-ray diffraction diagram of the water-granulated sample obtained is shown in FIG. 4.

As the results from FIG. 4, it was possible to identify obvious diffraction peaks, and thus, it was not possible to achieve complete vitrification.

TABLE 1

| | Amount of raw material fed (parts by mass) | | | | Heating temperature (° C.) | Presence of X-ray diffraction peak(s) |
|---|---|---|---|---|---|---|
| | $Na_2O•SiO_2$ | ZnO | $B_2O_3$ | Adsorbent | | |
| Example 1 | 3.84 | — | — | 10 | 1100 | No |
| Comparative Example 1 | — | 60 | 20 | 20 | 1100 | Yes |
| Comparative Example 2 | — | 60 | 20 | 26.7 | 1100 | Yes |

As clearly seen from FIG. 3, FIG. 4 and Table 1, by the method using the borosilicate glass of Comparative Example 1 and Comparative Example 2, completely vitrified waste was not obtained at a heating temperature of 1100° C. Meanwhile, according to the method of present invention, although the content of the adsorbent (72 wt %) in the raw material mixture is higher than that in Comparative Example 1 and Comparative Example 2, it can be seen that completely vitrified waste has been obtained.

Example 2

<Preparation of $Na_2O.SiO_2$ Component>
As a $Na_2O.SiO_2$ component, a commercially available anhydrous sodium metasilicate having the following composition (manufactured by Nippon Chemical Industrial Co., Ltd.) was used:
  $Na_2O$: 50.93 wt %
  $SiO_2$: 45.93 wt %, and
  $Na_2O/SiO_2$ molar ratio: 1.072.
<Preparation of Vitrified Waste>
Mixed were 10 g of the sample having Cs adsorbed thereto (GTS+SNT) prepared above and 3.84 g of the anhydrous sodium metasilicate prepared above to obtain a raw material mixture having at least the following composition:
  $Na_2O$: 21.7 wt %
  $SiO_2$: 22.7 wt %
  $TiO_2$: 36.7 wt %
  $Cs_2O$: 5.0 wt %, and
  $Na_2O/SiO_2$ molar ratio: 0.93.
Subsequently, the mixture was placed in a platinum crucible and heat-melted at 1100° C. for two hours.
Then, the melt was poured into a plate-like SUS, and left as it was for air-cooling to obtain vitrified waste.
The air-cooled product was pulverized after cooling, and the particle size was adjusted to 0.5 to 1 mm. Then, the pulverized product was subjected to XRD analysis. When the air-cooled sample obtained was subjected to XRD analysis, it was not possible to identify obvious diffraction peaks, and thus, it was possible to identify complete vitrification.

Example 3

<Preparation of $Na_2O.SiO_2$ Component>
As a $Na_2O.SiO_2$ component, a commercially available anhydrous sodium metasilicate having the following composition (manufactured by Nippon Chemical Industrial Co., Ltd.) was used:
  $Na_2O$: 50.93 wt %
  $SiO_2$: 45.93 wt %, and
  $Na_2O/SiO_2$ molar ratio: 1.072.
<Preparation of Vitrified Waste>
Mixed were 10 g of the Nb-CST sample having Cs adsorbed thereto prepared above and 3.84 g of the anhydrous sodium metasilicate prepared above to obtain a raw material mixture having at least the following composition:
  $Na_2O$: 22.3 wt %
  $SiO_2$: 24.6 wt %
  $TiO_2$: 25.2 wt %
  $Nb_2O_5$: 6.6 wt %
  $Cs_2O$: 4.1 wt %, and
  $Na_2O/SiO_2$ molar ratio: 0.88.
Subsequently, the mixture was placed in a platinum crucible and heat-melted at 1100° C. for 2 hours.
Then, the heated melt was poured into a plate-like SUS and left as it was for air-cooling to obtain vitrified waste.

The air-cooled product was pulverized after cooling, and the particle size was adjusted to 0.5 to 1 mm. Then, the pulverized product was subjected to XRD analysis. As a result, no obvious diffraction peak was observed, and complete vitrification was identified.

Example 4

Figure 5:
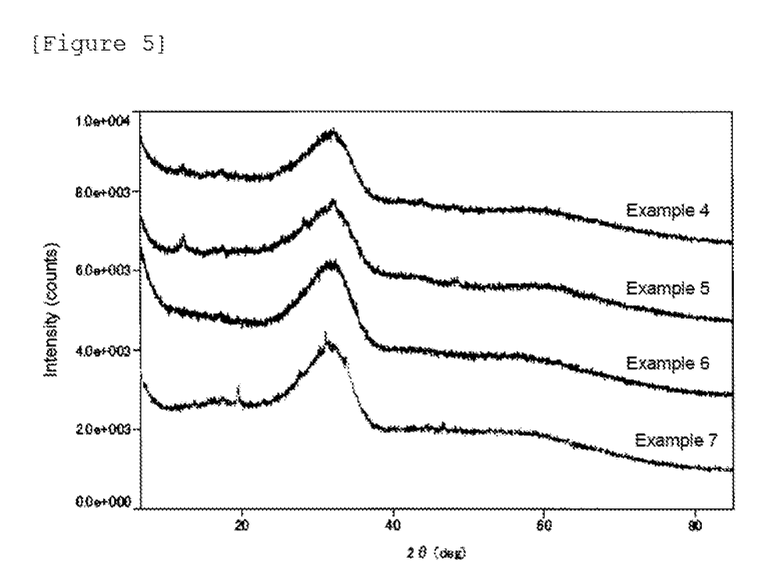
FIG. 5 is an X-ray diffraction diagram of air-cooled samples obtained in Examples 4 to 6.

<Preparation of $Na_2O.SiO_2$ Component>
As a $Na_2O.SiO_2$ component, a commercially available anhydrous sodium metasilicate having the following composition (manufactured by Nippon Chemical Industrial Co., Ltd.) was used:
  $Na_2O$: 50.93 wt %
  $SiO_2$: 45.93 wt %, and
  $Na_2O/SiO_2$ molar ratio: 1.072.
<Preparation of Vitrified Waste>
Mixed were 15 g of the sample having Cs adsorbed thereto (GTS+SNT) prepared above, 5.76 g of the anhydrous sodium metasilicate prepared above, and 2.22 g of aluminum hydroxide to obtain a raw material mixture having at least the following composition:
  $Na_2O$: 19.5 wt %
  $SiO_2$: 20.5 wt %
  $TiO_2$: 33.2 wt %
  $Cs_2O$: 4.6 wt %
  $Al_2O_3$: 6.3 wt %, and
  $Na_2O/SiO_2$ molar ratio: 0.92.
Subsequently, the mixture was placed in a platinum crucible and heat-melted at 1140° C. for 2.5 hours.
Then, the heated melt was poured into a plate-like SUS and left as it was for air-cooling to obtain vitrified waste.
The air-cooled product was pulverized after cooling, and the particle size was adjusted to 0.5 to 1 mm. Then, the pulverized product was subjected to XRD analysis. The XRD of the air-cooled sample obtained is shown in FIG. 5. As a result of FIG. 5, no obvious diffraction peak was observed, and complete vitrification was identified.

Example 5

<Preparation of $Na_2O.SiO_2$ Component>
As a $Na_2O.SiO_2$ component, a commercially available anhydrous sodium metasilicate having the following composition (manufactured by Nippon Chemical Industrial Co., Ltd.) was used:
  $Na_2O$: 50.93 wt %
  $SiO_2$: 45.93 wt %, and
  $Na_2O/SiO_2$ molar ratio: 1.072.
<Preparation of Vitrified Waste>
Mixed were 15 g of the sample having Cs adsorbed thereto (GTS+SNT) prepared above, 5.76 g of the anhydrous sodium metasilicate prepared above, and 3.17 g of aluminum hydroxide to obtain at least a raw material mixture having the following composition:
  $Na_2O$: 18.8 wt %
  $SiO_2$: 19.7 wt %
  $TiO_2$: 31.8 wt %
  $Cs_2O$: 4.4 wt %
  $Al_2O_3$: 8.7 wt %, and
  $Na_2O/SiO_2$ molar ratio: 0.92.
Subsequently, the mixture was placed in a platinum crucible and heat-melted at 1140° C. for 3 hours.
Then, the heated melt was poured into a plate-like SUS and left as it was for air-cooling to obtain vitrified waste.

The air-cooled product was pulverized after cooling, and the particle size was adjusted to 0.5 to 1 mm. Then, the pulverized product was subjected to XRD analysis.

The XRD of the air-cooled sample obtained is shown in FIG. 5. As a result of FIG. 5, no obvious diffraction peak was observed, and complete vitrification was identified.

Example 6

<Preparation of $Na_2O \cdot SiO_2$ Component>

As a $Na_2O \cdot SiO_2$ component, a commercially available anhydrous sodium metasilicate having the following composition (manufactured by Nippon Chemical Industrial Co., Ltd.) was used:
$Na_2O$: 50.93 wt %
$SiO_2$: 45.93 wt %, and
$Na_2O/SiO_2$ molar ratio: 1.072.

<Preparation of Vitrified Waste>

Mixed were 15 g of the sample having Cs adsorbed thereto (GTS+SNT) prepared above, 5.76 g of the anhydrous sodium metasilicate prepared above, and 3.48 g of zirconium hydroxide to obtain a raw material mixture having at least the following composition:

$Na_2O$: 18.5 wt %
$SiO_2$: 19.4 wt %
$TiO_2$: 31.4 wt %
$Cs_2O$: 4.3 wt %
$ZrO_2$: 4.3 wt %, and
$Na_2O/SiO_2$ molar ratio; 0.92.

Subsequently, the mixture was placed in a platinum crucible and heat-melted at 1140° C. for 2 hours.

Then, the heated melt was poured into a plate-like SUS and left as it was for air-cooling to obtain vitrified waste.

The air-cooled product was pulverized after cooling, and the particle size was adjusted to 0.5 to 1 m. Then, the pulverized product was subjected to XRD analysis. The XRD of the air-cooled sample obtained is shown in FIG. 5. As a result of FIG. 5, no obvious diffraction peak was observed, and complete vitrification was identified.

Example 7

<Preparation of $Na_2O \cdot SiO_2$ Component>

As a $Na_2O \cdot SiO_2$ component, a commercially available anhydrous sodium metasilicate having the following composition (manufactured by Nippon Chemical Industrial Co., Ltd.) was used:
$Na_2O$: 50.93 wt %
$SiO_2$: 45.93 wt %, and
$Na_2O/SiO_2$ molar ratio: 1.072.

<Preparation of Vitrified Waste>

Mixed were 15 g of the sample having Cs adsorbed thereto (GTS+SNT) prepared above, 5.76 g of the anhydrous sodium metasilicate prepared above, and 4.87 g of zirconium hydroxide to obtain at least a raw material mixture having the following composition:
$Na_2O$: 17.5 wt %
$SiO_2$: 18.4 wt %
$TiO_2$: 29.7 wt %
$Cs_2O$: 4.1 wt %
$ZrO_2$: 5.7 wt %, and
$Na_2O/SiO_2$ molar ratio: 0.92.

Subsequently, the mixture was placed in a platinum crucible and heat-melted at 1140° C. for 3 hours.

Then, the heated melt was poured into a plate-like SUS and left as it was for air-cooling to obtain vitrified waste.

The air-cooled product was pulverized after cooling, and the particle size was adjusted to 0.5 to 1 mm. Then, the pulverized product was subjected to XRD analysis.

The XRD of the air-cooled sample obtained is shown in FIG. 5. As a result of FIG. 5, no obvious diffraction peak was observed, and complete vitrification was identified.

TABLE 2

| | Amount of adsorbent contained (wt %) | Raw material mixture | | | | | | | | |
|---|---|---|---|---|---|---|---|---|---|---|
| | | Composition | | | | | | | | |
| | | $Na_2O$ (wt %) | $SiO_2$ (wt %) | $TiO_2$ (wt %) | $Nb_2O_5$ (wt %) | $Al_2O_3$ (wt %) | $ZrO_2$ (wt %) | $Cs_2O$ (wt %) | Molar ratio of $Na_2O/SiO_2$ | Molar ratio of $TiO_2/SiO_2$ |
| Example 1 | 72 | 23.5 | 27.2 | 42.2 | — | — | — | 5.8 | 0.88 | 1.17 |
| Example 2 | 72 | 21.7 | 22.7 | 36.7 | — | — | — | 5.0 | 0.93 | 1.21 |
| Example 3 | 72 | 22.3 | 24.6 | 25.2 | 6.6 | — | — | 4.1 | 0.88 | 0.77 |
| Example 4 | 67.3 | 19.5 | 20.5 | 33.2 | — | 6.3 | — | 4.6 | 0.92 | 1.22 |
| Example 5 | 65.5 | 18.8 | 19.7 | 31.8 | — | 8.7 | — | 4.4 | 0.92 | 1.21 |
| Example 6 | 68.6 | 18.5 | 19.4 | 31.4 | — | — | 4.3 | 4.3 | 0.92 | 1.22 |
| Example 7 | 67.3 | 17.5 | 18.4 | 29.7 | — | — | 5.7 | 4.1 | 0.92 | 1.22 |

<Cs Elution Test>

In a Teflon® pressure vessel, 2.5 g of a water-granulated sample or air-cooled sample obtained in each Example was placed together with 50 ml of ion exchange water, and the vessel was subjected to PCT test (pressure cooker test) at 2 atm (121° C.) for 48 hours. After the PCT test, the mixture was filtered, and the Cs ion concentration in the filtrate was analyzed by ICP-AES. Additionally, the Cs ion elution ratio from each water-granulated sample was determined by the following calculation expression. The results are shown in Table 3.

Cs ion elution ratio (%)=(ion concentration in filtrate/amount of Cs contained in water-granulated sample or air-cooled sample)×100    [Expression 1]

TABLE 3

| | Cs ion concentration in filtrate (ppm) | Elution ratio of Cs ion (%) |
|---|---|---|
| Example 1 | 48.4 | 0.020 |
| Example 2 | 73.6 | 0.031 |
| Example 3 | 34.7 | 0.030 |
| Example 4 | 17.7 | 0.0163 |
| Example 5 | 14.0 | 0.0133 |
| Example 6 | 14.0 | 0.0127 |
| Example 7 | 7.0 | 0.0065 |

The invention claimed is:

1. A method for producing solidified radioactive waste, comprising heat-melting a mixture that comprises a titanium-containing adsorbent having a radioactive element adsorbed thereto, a $SiO_2$ source, and an $M_2O$ source (M represents an alkali metal element) to form vitrified waste,
   wherein the $SiO_2$ source and the $M_2O$ source are each an alkali silicate.

2. The method for producing solidified radioactive waste according to claim 1, wherein the titanium-containing adsorbent is one or two or more selected from the group consisting of silicotitanate, an alkali nonatitanate, and titanium hydroxide.

3. The method for producing solidified radioactive waste according to claim 1, wherein the radioactive element is cesium and/or strontium.

4. The method for producing solidified radioactive waste according to claim 1, wherein the alkali silicate is an anhydride.

5. The method for producing solidified radioactive waste according to claim 1, wherein the alkali silicate is sodium metasilicate.

6. A method for producing solidified radioactive waste, comprising heat-melting a mixture that comprises a titanium-containing adsorbent having a radioactive element adsorbed thereto, a $SiO_2$ source, and an $M_2O$ source (M represents an alkali metal element) to form vitrified waste,
   wherein the mixture comprises at least $M_2O$: 15 to 35% by mass, $TiO_2$: 25 to 50% by mass, and $SiO_2$: 15 to 35% by mass.

7. The method for producing solidified radioactive waste according to claim 1, wherein a melt-heating temperature is 1000° C. or more.

8. The method for producing solidified radioactive waste according to claim 1, wherein the mixture further comprises a metal oxide source comprising one or two or more metal elements selected from the group consisting of Zr, Al, Nb, Zn, Ca, and Mg.

* * * * *